Patented Mar. 6, 1928.

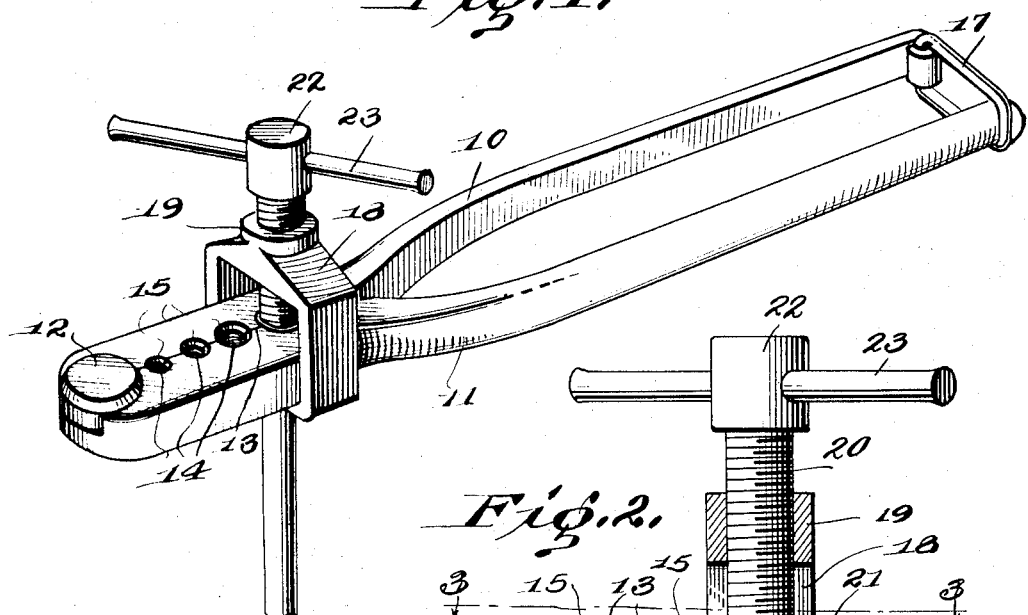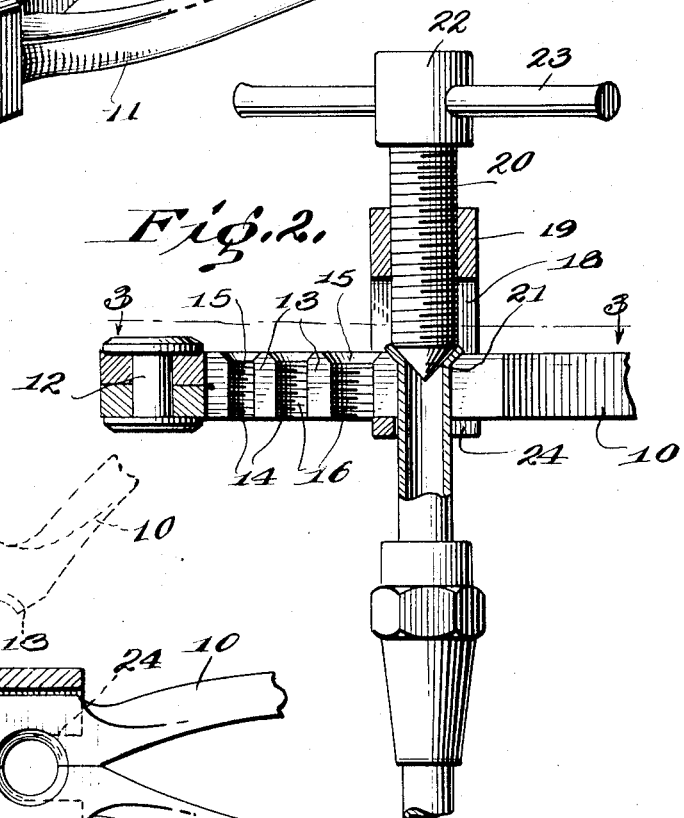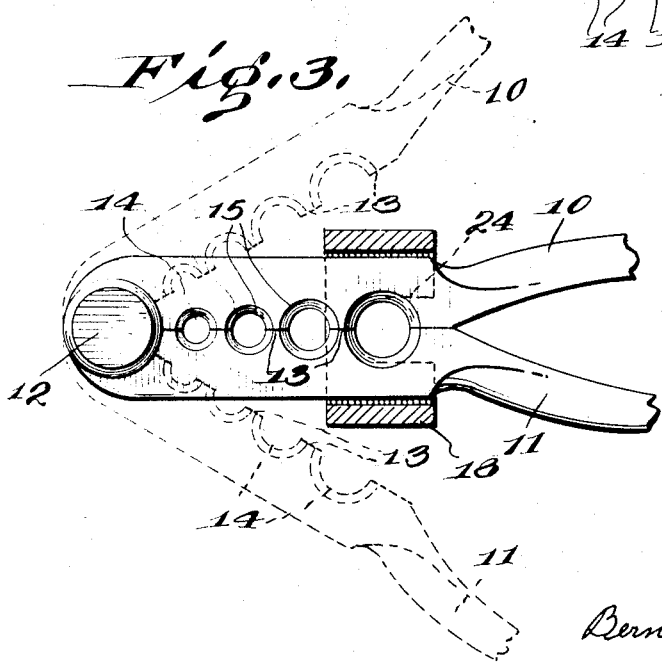

1,661,367

UNITED STATES PATENT OFFICE.

BERNARD F. HELMINIAK, OF MILWAUKEE, WISCONSIN.

TUBE-FLARING TOOL.

Application filed September 26, 1925. Serial No. 58,792.

The present invention relates to a device for flaring the ends of copper tubing in order that said ends may be attached to nipples by the threading of a coupling member positioned on the tubing on said nipples, and aims to provide a novel and improved device of this character which will conveniently and efficiently grip the tube without distorting same in order to properly support the tube during the flaring thereof.

Another object of the invention is the provision of a tool arranged for securely holding tubes of various sizes, and having the flaring element slidably positioned thereon for association with a tube of any size clamped on the tool.

A further object of the invention is to provide a pair of levers having one end of each pivotally connected together, each having semi-circular grooves provided therein of various sizes at the abutting surfaces of said levers for coacting with one another to form cylindrical openings for clamping tubes therein, said grooves having screw threads arranged on the surfaces thereof for slightly biting into the tubes to form tight engagement therewith, and the provision of means at the free ends of the levers for holding said levers in a clamped position on a tube.

It is also an object of the invention to provide a tool of the above indicated character, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:

Figure 1 is a perspective view of my improved tool, showing a tube being flared, Figure 2 is a fragmentary vertical section, showing a tube attached thereto, and Figure 3 is a horizontal section taken on line 3—3 of Figure 2.

In carrying out my invention, the numerals 10 and 11 designate a pair of levers which are pivotally connected together, as at 12, at one end of each lever. The levers 10 and 11 adjacent their point of pivot are enlarged in width and are provided with abutting surfaces 13. Arranged in the faces of the abutting surfaces 13 are semi-circular grooves 14, the grooves on one lever being adapted to coact with the grooves on the other lever so as to provide cylindrical openings at the point where said levers abut for receiving and holding therein tubes to be flared. It is to be noted that the semi-circular grooves 14 are of various sizes so as to provide cylindrical openings of different sizes which will snugly engage tubes positioned therein and hold the same during the flaring thereof. The upper portions of the grooves 14 are enlarged or beveled outwardly, as at 15, so as to provide a seat or female die for forming the flared portions on the tubes. The surfaces of the grooves 14 are provided with screw threads 16 which will slightly bite into the tubes and prevent downward sliding movement of the tubes positioned on my improved tool during the flaring operation.

The levers 10 and 11 after forming the tube holding means extend away from each other in spaced relation, and have provided on their free ends a means for holding the abutting surfaces 13 of the levers in engagement with each other, said means being arranged by pivotally connecting to one of the levers an elongated loop member 17 which is adapted to be swung over the end of the other lever for preventing swinging movement of the levers away from each other.

Arranged about the abutting ends of the levers 10 and 11 is a rectangular frame 18 which is adapted to be moved longtiudinally of the levers for coacting with the various grooves formed in said levers in order to flare a tube, said rectangular frame 18 having an enlarged portion or boss 19 formed on its upper side through which is screw threaded a bar 20. The lower end of the bar 20 is tapered, as at 21, to a point so as to engage into the interior of a tube in order to flare the same against and in engagement with the outwardly beveled portions 15 of the semi-cylindrical grooves. It is to be noted that during the flaring of a tube that the outwardly beveled portions 15 of the semi-cylindrical grooves form the female portion of dies while the tapered end 21 of the bar 20 forms the male portion, thus forming a structure which will flare the ends of tubes at uniform angles so that said tubes may be properly connected to their respective parts. The upper end of the bar 20 is provided with an enlarged head 22 through which is slidably mounted a cross rod 23 for permitting the turning of the bar 20 in order to feed the same upwardly or downwardly during the flaring of a tube. As a tube received in any one of the cylindrical openings formed by the semi-cylindrical grooves 14 extends downwardly from the tool it is necessary to provide a notched or cut away portion 24 in the lower side of the rectangular frame 18 so that said rectangular frame may be arranged centrally above the tube in order that the tube may be properly flared.

In operation, the levers 10 and 11 are swung upon their pivots away from each other so that a tube may be inserted in the semi-circular grooves 14 of the levers according to the size of the tube, said grooves being arranged for accommodating standard size tubes. The levers are then swung towards each other bringing the abutting surfaces 13 in contact with each other and causing the threads provided on the surfaces of said grooves to slightly bite or engage into the soft copper tubing in order to properly support the tubing without distorting same. The levers are held in such position by swinging of the elongated loop 17 attached to the free end of one lever over the free end of the other. The rectangular frame is then moved to a point centrally of the tube clamped to my tool and by turning the bar 21 in the proper direction, the tapered end of the bar will engage into the tube, and continuation of the turning movement will cause the end of the tubing to be flared and formed so as to engage the outwardly beveled portion of the grooves 14 the tubing is received in. After the end of the tubing has been flared, the bar 21 is fed away from the end of the tubing and the free ends of the levers disconnected so as to permit said levers to be swung away from each other to permit the removal of the tubing. It can thus be seen that I have provided a simple and substantial structure which will efficiently flare the ends of various size tubing for providing means for connecting the ends of said tubing with their respective parts.

Having thus described my invention, what I claim as new is:

1. A tube flaring tool comprising a pair of levers pivotally connected together at one end thereof, enlarged abutting surfaces provided on said levers, said levers having semi-circular grooves provided therein at said abutting surfaces for providing cylindrical openings when said levers are in abutting position, said grooves being beveled outwardly at their upper ends so as to enlarge the same, said grooves being provided for receiving tubes therein of various sizes, means for holding said levers in abutting position, a rectangular frame slidably mounted upon said levers adapted to be moved over the grooves provided in said levers, a bar threaded in said frame, means for rotating said bar for feeding the same towards or away from said cylindrical openings, and a tapered surface formed on the lower end of said bar for engaging into a tube received in a pair of the semi-circular grooves for flaring the end of said tube outwardly in engagement with the outwardly beveled portions of said semi-circular grooves.

2. A tube flaring tool comprising a pair of levers pivotally connected together, abutting surfaces provided on said levers, said levers having semi-circular grooves provided therein at said abutting surfaces for providing cylindrical openings when said levers are in abutting position, said grooves having the surfaces thereof screw threaded for slightly biting into a tube positioned in said grooves in order to hold said tube against downward movement, means for holding said levers in abutting position, a frame mounted upon said levers, and a bar threaded in said frame and being adapted to be moved downwardly and into the tube received in said semi-circular grooves flaring said tube.

3. A tube flaring tool comprising a clamping member having a series of tube receiving openings of various sizes therein, a frame slidably arranged on said clamping member adapted to be moved over said openings, and a screw threaded member carried by said frame and engageable into the end of a tube held by said clamping member for flaring the tube.

In testimony whereof, I have affixed my signature.

BERNARD F. HELMINIAK.